United States Patent [19]

Heilman et al.

[11] 4,017,453

[45] Apr. 12, 1977

[54] HOMOGENEOUS POLYEPOXIDE-POLYANHYDRIDE COMPOSITIONS

[75] Inventors: William J. Heilman, Allison Park, Pa.; Frank C. Peterson, Orange, Tex.; Mical C. Renz; Leslie P. Theard, both of Houston, Tex.

[73] Assignee: Gulf Oil Corporation, Pittsburgh, Pa.

[22] Filed: June 26, 1975

[21] Appl. No.: 590,460

Related U.S. Application Data

[63] Continuation-in-part of Ser. No. 501,634, Aug. 29, 1974, abandoned.

[52] U.S. Cl. .................... 260/42.18; 260/42.28; 260/836; 260/837 R; 260/837 PV
[51] Int. Cl.² ............. C08K 7/14; C08L 63/00; C08L 63/02
[58] Field of Search ........ 260/836, 837 R, 837 PV, 260/42.18, 42.28

[56] References Cited

UNITED STATES PATENTS

| 3,099,638 | 7/1963 | Foster | 260/837 |
| 3,637,579 | 1/1972 | Barie | 260/836 |
| 3,657,196 | 4/1972 | Foster | 260/837 |
| 3,703,501 | 11/1972 | McCartney | 260/836 |
| 3,732,332 | 5/1973 | Curtis | 260/837 |

FOREIGN PATENTS OR APPLICATIONS 591,565 1/1960 Canada .............. 260/837

*Primary Examiner*—Harry Wong, Jr.

[57] ABSTRACT

A homogeneous mixture of a polyanhydride and a polyepoxide is prepared by the copolymerization of an olefinically unsaturated monomer capable of polymerization by free-radical means with an olefinically unsaturated monoanhydride and an olefinically saturated polyanhydride in the presence of a polyepoxide and an anhydride accelerator without substantial anhydride-epoxide cross-linking. As an example, reinforcing glass fibers are impregnated with a solution of styrene, maleic anhydride, stryene-maleic anhydride copolymer, a diglycidyl ether of bisphenol A and 1-methylimidazole and the resin is thickened in situ by copolymerization of the styrene, maleic anhydride and styrene-maleic anhydride copolymer to form a moldable, homogeneous mixture of styrene-maleic anhydride copolymer, diglycidyl ether of bisphenol A, 1-methylimidazole and reinforcing glass fibers.

16 Claims, No Drawings

HOMOGENEOUS POLYEPOXIDE-POLYANHYDRIDE COMPOSITIONS

This patent application is a continuation-in-part of our U.S. patent application Ser. No. 501,634, filed Aug. 29, 1974 now abandoned.

This invention relates to the preparation of homogeneous, heat curable, resin mixtures comprising a polyanhydride, a polyepoxide, and an anhydride accelerator. The homogeneous resin mixture is made by the copolymeriztion of an olefinically unsaturated monomer capable of polymerization by free-radical means with an olefinically unsaturated monoanhydride and preferably a saturated polyanhydride in the presence of a polyepoxide and an anhydride accelerator without the occurence of substantial anhydride-epoxide reaction. This homogeneous resin mixture is a substantially noncrosslinked thermosettable composition which can be heat cured to a hard, infusible resin through the reaction of the anhydride groups and the epoxy groups.

In an application of this invention a solution of unsaturated monoanhydride such as maleic anhydride, an olefinically unsaturated monomer which is capable of polymerization by free-radical means such as styrene, a polyanhydride such as preformed styrene-maleic anhydride copolymer, an anhydride accelerator such as 1-methylimidazole and a polyepoxide such as diglycidyl ether of bisphenol A is intermixed with reinforcing fibers such as chopped glass fibers and an inert filler. This soft, sticky mass cannot be handled or molded. By our invention it is thickened in a first stage polymerization reaction to a non-tacky, handleable intermediate composition which is suitable for fabrication in a second stage polymerization reaction to a desired product of superior properities.

In this first stage reaction to prepare the thickened intermediate compound, the olefinic double bonds of the olefinically unsaturated components are interreacted in situ by free radical initiation, preferably by a chemical free radical initiator in the reaction mixture, into polyanhydridie molecules which are homogeneously intermixed with the other resin components. This first stage reaction is carried out at conditions that avoid substantial reaction of the anhydride and epoxy groups. In the second stage reaction the anhydride and epoxy groups in the intermediate compound are interreacted under the influence of heat and the anhydride accelerator to form a rigid, thermoset resin product having excellent physical, chemical and electrical properties.

The olefinically unsaturated monomer such as styrene also functions in the initial resin mixture as a solvent for the other resin components. Since this olefinically unsaturated monomer is reacted in the first stage copolymerization reaction, the intermediate composition can be prepared with substantially no volatile component which would interfere, if present, with proper second-stage curing. The thickened intermediate compound can range from a relatively hard, rigid material to a flexible material by adjustment of the resin formulation and appropriate control of the first stage reaction without substantial anhydride-epoxy reaction. The initial mixture of resin and reinforcing fiber can be spread out in a comparatively thin sheet for the thickening reaction. This not only makes possible better temperature control in the first stage reaction but also provides an intermediate product which is in a convenient form for further fabrication. Thus, the intermediate composition in sheet form can be used directly, after cutting into suitably sized pieces as desired, in compression molding. Also, a hardened intermediate composition in sheet form, hardened by appropriate choice of the resin formulation and not by substantial anhydride-epoxide reaction, can be reduced to granules or chips for use in injection molding or transfer molding fabrication. A non-reinforced intermediate resin product can be prepared by our procedure and pulverized for use in thermosetting powder coating or powder molding applications. In a further application of the resin formulation, glass fibers in the form of roving, tapes, and the like for use in filament winding can be coated with the liquid resin which is then solidified by the first-stage reaction for subsequent winding into the form of the desired product prior to anhydride-epoxy cure. The non-reinforced, unfilled formulations cure to a clear, transparent resin product, which evidences homogeneity comprising a single polymeric species. In contrast a cloudy, opaque product evidences heterogeneity.

The intermediate resin comprising a homogeneous mixture of polyanhydride molecules and polyepoxide molecules together with the anhydride accelerator is a thermosettable material which melts or softens and flows at an elevated temperature prior to curing through the anhydride-epoxy reaction. Since the anhydride-expoxy reaction is a cross-linking, thermosetting reaction, substantial anhydride-expoxy reaction in the first-stage cure results in a gelled intermediate. This gellation, which is the result of cross-linking, interferes with the proper resin flow that is required to produce the desired fabricated product in the second-stage cure. Therefore, the first stage cure must be carried out without substantial anhydride-expoxy reaction, that is, less anhydride-epoxy reaction in the first-stage reaction than the amount which would interfere with the resin flow which is required in the second stage fabrication. Some anhydride-epoxy reaction can be tolerated in the first-stage reaction without significantly interfering with second-stage fabrication but the maximum permissible amount will vary depending on the second-stage curing conditions and the nature of the final product. First-stage anhydride-expoxy reaction can be minimized or substantially eliminated by appropriate selection of the formulation including the free radical initiation and the anhydride accelerator, exclusion of undesirable impurities, adjustment of first-stage copolymerization conditions, and the like.

It is well known that the copolymerization reaction of styrene and maleic anhydride is a highly exothermic reaction. Since this copolymerization reaction is highly exothermic and since the anhydride-epoxy reaction is driven by heat, it is surprising that the first-stage exothermic copolymerization reaction can be carried out in accordance with our procedures without concurrently causing a substantial amount of the heat-sensitive, thermosetting reaction which would prevent resin flow in the second-stage cure or would interfere with successful second-stage molding. And it is particularly surprising that this rection to the intermediate product can be carried out in the presence of the anhydride accelerator without a substantial amount of the flow-preventing, anhydride-epoxy reaction.

It is also well known that styrene and maleic anhydride preferentially polymerize into a styrene-maleic anhydride copolymer having substantially equal molar proportions of each component. However, we have surprisingly discovered that styrene and maleic anhydride can be reacted in our novel process to form a styrene-maleic anhydride copolymer having a styrene to maleic anhydride ratio substantially greater than one to one under conditions that the prior art indicates produce a one to one molar ratio. Since styrene is an excellent and inexpensive solvent, it may be desirable to incorporate an excess of this reactive monomer into the resin to obtain the desired resin fluidity and adjust the cross-link density in the cured resin, provided that the excess styrene does not significantly detract from the excellent properties of the finally cured product. As stated, it would be expected from existing knowledge that the maleic anhydride would react with styrene in equal molar proportions. It would also be expected that excess styrene would form property-degrading polystyrene molecules interspersed therein. It has been discovered that under the conditions at which the copolymerization is carried out, excess styrene attaches to styrene-maleic anhydride copolymer by graft polymerization in the form of relatively short graft branches that do not cause a significant degradation of the properties of the fully cured resin. Due to this graft polymerization an initial resin solution containing a substantial molar excess of styrene can be utilized without the formation of sufficient polystyrene to degrade or cloud the resin product.

In preparing a styrene-maleic anhydride copolymer in situ in admixture with a polyepoxide by the copolymerizaion of styrene and maleic anhydride, we have found that the presence of preformed styrene-maleic anhydride copolymer is preferred in the starting resin solution in addition to the styrene and maleic anhydride monomers due to the beneficial effect in the overall properties of the fully cured product. This preformed polyanhydride provides a nucleus for styrene and maleic anhydride addition, including styrene grafting, in a more controlled reaction. The presence of preformed polyanhydride also exercises a beneficial control of the free radical reaction and reduces the amount of the styrene-maleic anhydride copolymer to be produced by the highly exothermic reaction of styrene with maleic anhydride in order to obtain the requisite anhydride-epoxy cross-link density, thereby reducing the overall amount of heat generated by this reaction. This reduction in the generation of heat in the thickening reaction is enhanced by the fact that the graft reaction of styrene to the styrene-maleic anhydride copolymer generates much less heat than the reaction of styrene with maleic anhydride. The presence in the resin formulation of the preformed polyanhydride, the reinforcing fiber, the filler and other components that are used in the formulation also moderates the temperature rise in the reacting mixture by absorbing some of the heat generated in the reaction.

Styrene-maleic anhydride copolymers are solids. The room temperature (25° C) solubility in styrene of an equimolar copolymer of styrene and maleic anhydride is very low. Copolymers of styrene and maleic anhydride having styrene to maleic anhydride ratios that are greater than one to one can be prepared by special techniques. The room temperature solubility in styrene of a copolymer having a styrene to maleic anydride ratio of two to one is also very low. When the styrene-maleic anhydride copolymer possesses large styrene to maleic anhydride ratios, the copolymer possesses a significant solubility in styrene. However, a large ratio of styrene to maleic anhydride in the copolymer lowers the quality of the resulting thermoset product for many uses by lowering its cross-link density. Similarly, a large proportion of solvent styrene in the initial reaction mixture can lower the quality of the thermoset product by producing a heterogeneous, polystyrene-containing product, by lowering its cross-link density and the like.

Maleic anhydride is also a solid. At room temperature styrene-maleic anhydride solutions can be prepared having a maximum solids content of about 22 weight percent. Larger amounts of maleic anhydride can be dissolved in the styrene at an elevated temperature, but the excess maleic anhydride will precipitate out to a 22 percent content when the solution is cooled to room temperature. However, we have discovered that if the solution of styrene and maleic anhydride is moderately heated to dissolve more than 22 percent maleic anhydride and if the solid styrene-maleic anhydride copolymer is dissolved into the warmed solution, the maleic anhydride in excess of the original 22 percent will stay in solution when the solution is cooled to room temperature.

We have also discovered that a styrene-maleic anhydride solution at a slightly elevated temperature which contains an excess of maleic anhydride over that which is soluble at room temperature will dissolve a surprising excess of a low styrene content styrene-maleic anhydride copolymer over the amount which is soluble in styrene alone at that temperature or in a styrene-maleic anhydride solution containing a lesser amount of maleic anhydride at that same temperature. The overall result is a surprising reciprocal solubility effect, that is, the solid maleic anhydride enhances the solubility of the solid styrene-maleic anhydride copolymer and the solid styrene-maleic anhydride copolymer concurrently enhances the solubility of the solid maleic anhydride.

We have made a further advantageous discovery. That is, the presence of the copolymer solubilizing maleic anhydride monomer provides the surprising effect of producing a resin solution having a substantially lower room temperature viscosity than possessed by a styrene solution of a styrene-maleic anhydride copolymer having the same weight proportion of these two components but no maleic anhydride. Thus, a solution prepared at an elevated temperature from equal amounts by weight of styrene and a two to one styrene-maleic anhydride copolymer will be a putty-like, semisolid at room temperature. However, this equal parts by weight solution of styrene and this copolymer can be prepared at a lower temperature with maleic anhydride as a solubility enhancer to form a solution having a room temperature viscosity of less than 1,000 cps. This surprising effect results in a plurality of desirable advantages, that is, a room temperature resin solution having a very high solids content, a relatively low overall styrene content, a high fluidity, and the like. These discoveries regarding solution properties have enabled us to optimize proportions with regard to cost, polymerization characteristics and product properties.

Since the first stage copolymerization reaction is a free radical reaction, suitable free radical initiation is used to obtain the desired copolymerization. The copolymerization reaction is preferably carried out at a moderately elevated temperature. At a low temperature the free radical reaction is inconveniently slow and at a high temperature the anhydride-epoxy cross-linking reaction becomes excessive. Since the first-stage reaction is exothermic, the internal resin temperature will rise during the reaction above the temperature of the resin at which the reaction is initiated. This first stage reaction can successfully be carried out at a maximum internal temperature of the resin as determined by an embedded thermocouple of about 150°, preferably about 125° and most preferably about 100° C. At the higher internal temperatures short reaction times are insured by using particularly active free radical initiators, preferably accompanied by rapid heat up and cool down of the resin mixture in order to minimize the cross-linking reaction. Although the thickening reaction can be initiated at a resin temperature below room temperature, this procedure is less desirable than the initiation of the reaction at about room temperature or more preferably at a moderately elevated temperature.

Suitable free radical initiation includes the use of chemical free radical initiators, ionizing radiation, ultraviolet radiation, and the like. Suitable chemical free radical initiators include the organic peroxides such as methyl ethyl ketone peroxide with vanadium neodecanoate or cobalt naphthenate as a promoter, dicyclohexyl peroxydicarbonate, t-butyl peroxyneodecanoate, t-butyl peroxypivalate, and the like; azo compounds such as 2,2'-azobis(2,4-dimethyl-4-methoxyvaleronitrile), 2,2'-azobis(2,4-dimethylvaleronitrile), 2,2'-azobis(isobutyronitrile), 2-t-butylazo-2-cyano-4-methoxy-4-methylpentane, and the like. It is of critical significance that the selection of the anhydride accelerator be carefully correlated with the free radical initiation to insure that the desired copolymerization reaction occurs without substantial cross-linking. For example, if a chemical free radical initiator is used, the anhydride accelerator must be substantially inactive during the copolymerization reaction at the temperature and for the time that the free radical reaction is carried out. Thus, when a chemical free radical initiator is used, it should have a relatively short half-life at a moderate temperature and be used in a suitable amount to cause an active copolymerization reaction at a moderate temperature. In contrast with the activity of the free radical initiation, the anhydride accelerator will possess a low activity for the anhydride-epoxy reaction. That is, low activity as applied to the anhydride accelerator is a relative term which is applied as a contrast with the substantially greater activity of the free radical initiation at the same conditions. Furthermore, the selection of the chemical free radical initiator must be correlated with the anhydride accelerator to avoid any interference of the effect of the free radical initiator by the anhydride accelerator. The peroxide initiators appear to be more susceptible to a deactivating effect by some anhydride accelerators.

The compositions comprise an olefinically unsaturated monomeric compound containing one olefinic double bond capable of polymerization by free radical means as its only functional group. As used herein and in the claims, functional group is used to mean any group which is reactive at the conditions and in the environment involved in the first-stage copolymerization. Olefinically unsaturated monomeric compounds which polymerize by a free radical mechanism are well known in the art and are generally terminally unsaturated compounds which contain a substituent directly connected to the double bond that activates the double bond for polymerization by effecting a net electron withdrawal from the olefinic double bond. Examples of useful olefinically unsaturated monomers which are capable of polymerization by free radical means include vinyl substituted mononuclear aromatic compounds such as styrene, ring substituted chloro-, bromo- or lower alkyl styrene, such as p-chlorostyrene, 3-bromostyrene, vinyl toluene, and the like, but not the α or β-substituted styrenes such as α-methylstyrene and β-bromostyrene. Also useful are lower alkyl acrylates and methacrylates, such as methyl methacrylate, methyl acrylate, ethyl acrylate, and the like; vinyl acetate, acrylonitrile; vinyl chloride; vinyl bromide; vinylidene chloride; diallyl phthalate; and the like. As used herein, the expression lower alkyl refers to alkyl havng one to four carbon atoms, inclusive.

The unsaturated monoanhydride which can be used in making the intermediate composition by copolymerization includes maleic anhydride, chloromaleic anhydride, methylmaleic anhydride, ethylmaleic anhydride, dichloro maleic anhydride, dimethylmaleic anhydride, n-butylm aleic anhydride, phenylmaleic anhydride, diphenylmaleic anhydride, chloromethylmaleic anhydride, bromophenylmaleic anhydride, itaconic anhydride, and the like.

The preformed polyanhydride which can be used in making the molding composition is the copolymer of an olefinically unsaturated monomer which is capable of free radical polymerization as described and the described unsaturated monoanhydride. For example, useful polyanhydrides include the copolymers of styrene and maleic anhydride having a ratio of styrene to maleic anhydride from about 1:1 to about 10:1, preferably from about 1:1 to about 3:1, and most preferably about 2:1, and having an average between two and about 500, preferably between two and about 200 repeating units, and the like. Also the preformed polyanhydride can be the equimolar copolymer of the unsaturated monoanhydride as described and one or more two to 20 carbon, preferably two to 10 carbon, 1-alkenes or halogen-substituted 1-alkenes having an average of two to about 500, preferably two to about 200 repeating units. Suitable 1-alkenes include ethylene, vinyl chloride, 1-propene, 1-butene, 1-pentene, 1-hexene, 1-heptene, 1-octene, 1nonene, 1-decene, 5-chlorohexene-1, 1-undecene, 1-dodecene, 1-tridecene, 1-tetradecene, 1-octadecene, 4-methyl-1-heptene, and the like.

A saturated monoanhydride can replace a part of the preformed polyanhydride, preferably no greater than 50 percent measured in anhydride equivalents. Since the saturated monoanhydride may reduce the cross-link density of the fully cured product with a concomittant effect on its properties, it is less preferred than the polyanhydride for this reason. The preformed polyanhydride and the saturated monoanhydride comprise the saturated anhydride component. Suitable saturated monoanhydrides include phthalic anhydride, tetrahydrophthalic anhydride, hexahydrophthalic anhydride, methyltetrahydrophthalic anhydride, dodecenylsuccinic anhydride, chlorendic anhydride, a mixture of methyl bicyclo (2.1.2)-heptane-2,3-dicarboxylic anhydride isomers (Nadic methyl anhydride), mixtures thereof, and the like.

The expressions polyepoxide and epoxy resins are used herein interchangeably to refer to the broad class of epoxy containing reactants which react with the anhydride containing reactant during the second stage thermosetting cure to produce the hard infusible resin product. The polyepoxide can be a single compound containing at least two epoxy groups in which case it is a diepoxide. It can also contain a variety of molecular species havng a varying number of epoxy groups per molecule such that the average number of epoxy groups per molecule, that is the epoxy equivalent value, is specified. The epoxy equivalent value of these polyepoxides comprising a mixture of molecular species is greater than one and is preferably about two or more, but will generally not be a whole integer. The epoxy equivalent value is obtained by dividing the average molecular weight of the polyepoxide by its epoxide equivalent weight (grams of the polyepoxide containing one gram equivalent of epoxide). The polyepoxide can be aliphatic, cycloaliphatic, aromatic, heterocyclic mixtures of these, saturated or unsaturated, and the like. It can be liquid or solid but must be soluble in the resin solution, or if not soluble capable of forming a homogeneous dispersion in the resin solution.

This broad class of epoxy resin which is useful in forming the epoxy containing polymer with this resin-forming solution is exemplified by reference to several of the better known types. The glycidyl group of epoxy resins is an important and useful type of epoxy resin. This group includes the glycidyl ethers, the glycidyl esters, the glycidyl amines, and the like. The glycidyl ethers include the glycidyl ethers of mononuclear polyhydric phenols, polynuclear polyhydric phenols and the aliphatic polyols. They may be single compounds or more commonly are a mixture of compounds, some of which are polymeric in nature. Illustrative of glycidyl ethers are the di or polyglycidyl ethers of ethylene glycol; trimethylene glycol; glycerol; diglycerol; erythritol; mannitol; sorbitol; polyallyl alcohol; butanediol; hydrogenated bisphenol A; and the like.

The glycidyl ethers of polyhydric phenols include the glycidyl ethers of resorcinol; hydroquinone; catechol; pyrogallol; and the like as well as the glycidyl ethers of polynuclear phenols such as bisphenol A; bis(4-hydroxyphenyl)methane; and the like, and glycidyl ethers of the novolac resins such as bisphenol F and the like. The epoxy resins also include epoxidized olefins generally based on naturally occurring oils, such as epoxidized soybean oil, epoxidized cotton seed oil, epoxidized castor oil, epoxidized linseed oil, epoxidized menhaden oil, epoxidized lard oil and the like, but also including epoxidized butadiene, epoxidized polybutadiene, and the like.

Additional useful epoxy resins are diglycidyl isophthalate; triglycidyl p-aminophenol; diglycidyl phenyl ether; triglycidyl ether of trihydroxybiphenyl; diglycidyl ether of bisphenol PA; triglycidoxy-1,1,3-triphenylpropane; and the like. Further examples of epoxy resins are vinylcyclohexenedioxide; limonene dioxide; 2,2-bis(3,4-epoxycyclohexyl)propane; diglydicyl ether; bis(2,3-epoxycyclopentyl)ether; dicyclopentadiene dioxide; 3,4-epoxycyclohexylmethyl-(3,4-epoxy)cyclohexane carboxylate; and the like. Further information on these epoxy resins and additional examples of useful epoxy resins are discussed and/or referred to in HANDBOOK OF EPOXY RESINS by H. Lee and K. Neville, McGraw-Hill Book Co., 1967.

The presence of active hydrogen atoms such as found in water and in hydroxyl and carboxyl induce the anhydride-epoxy reaction and are particularly active in the presence of the anhydride accelerators. This is described in the above book by Lee and Neville. For this reaction, it is essential particularly for significant shelf life of the intermediate composition that the presence of active hydrogen be minimized or substantially eliminated as a component or impurity in the initial resin mixture, particularly in the form of water, carboxyl or hydroxyl, or in the anhydride accelerator. This is accomplished by assuring that the initial anhydride reactants are substantially carboxyl-free and that all reactants are protected against contamination from atmospheric moisture. Predrying of one or more of the reactants may be desirable. Some polyepoxides such as the diglycidyl ether of bisphenol A contain reactive hydroxyl in each repeating unit. Hydroxyl is substantially eliminated in this instance by selecting a diglycidyl ether of bisphenol A which has a relatively low epoxy equivalent weight. As used herein, the expression "substantially free of active hydrogens" is used to mean that the reaction mixture contains insufficient active hydrogens to cause, in the presence of the anhydride accelerator, substantial anhydride-epoxy reaction in the first-stage reaction.

It is also possible to substitute a low viscosity monoepoxy compound as a diluent for up to 50 percent of the polyepoxide determined as epoxy equivalents to increase the fluidity of the resin mixture. Since the incorporation of a monoepoxy diluent may reduce the cross-link density with a concomitant modification of properties of the fully cured resin, its use is limited to an amount which will not adversely affect the combination of properties required in the resin product. Suitable monoepoxy diluents include epichlorohydrin, glycidyl methacrylate, phenylglycidyl ether, butylglycidyl ether, allylglycidyl ether, styrene oxide, and the like.

In preparing the initial resin mixture the olefinically unsaturated monomer which is capable of polymerization by free radical means is used both as a reactant and as a solvent for the other resin components. It is used in an amount of about five to about 80 weight percent of the total resin components, preferably about 10 to about 60 weight percent of the resin mixture and most preferably about 15 to about 50 weight percent of the resin mixture. The molar ratio of the olefinically unsaturated monomer to the unsaturated monoanhydride that is conveniently used is from about 0.5:1 to about 8:1, preferably about 1:1 to about 4.5:1 and most preferably about 1:1 to about 3:1. For optimum properties in the fully cured product using styrene and maleic anhydride, a ratio of about 1:1 to about 3:1 is preferred, while a much higher ratio can be effectively used when methyl methacrylate and maleic anhydride are the copolymerization reactants. Thus it is noted that the preferred relative proportion of reactants depends upon the specific reactants used as well as the desired product properties.

The unsaturated monoanhydride is preferably used with a saturated polyanhydride as described. The anhydride equivalent ratio of the unsaturated monoanhydride to the sum of the unsaturated monoanhydride and the saturated anhydride component can suitably be as low as about 0.2:1, preferably as low as about 0.4:1 and most preferably as low as about 0.5:1; and as high as about 1:1, preferably as high as about 0.9:1 and most preferably as high as about 0.8:1. The anhydride to epoxide equivalent ratio; that is the A/E ratio, is conveniently used to express the relative proportions of the anhydride groups and the epoxy groups present in a resin mixture, particularly when mixtures of molecules of different sizes in the anhydride and epoxide components are involved. We have found that the A/E ratio can suitably be from about 0.1:1 to about 2.5:1, preferably from about 0.3:1 to about 1.5:1 and most preferably from about 0.5:1 to about 1.3:1.

The resin composition is preferably formed in sheets using a fiber glass reinforcement. Fiber glass in various forms is well known and commercially available for resin-fiber glass compositions. The fiber glass can be in the form of a woven glass fabric or randomly distributed glass fibers. When chopped glass fibers are used, they can suitably range from about 3 mm. to about 50 mm. in length and preferably from about 5 mm. to about 25 mm. in length. Other fibrous material can be used as the reinforcement or core material in the form of randomly distributed particles, fibers, fluff, paper, woven fabric, and the like. This can be made from natural materials such as cellulose, including sisal, hemp, cotton and linen, asbestos, etc., or a synthetic such as nylon, polyester, polyolefin, and the like.

The resin compositions can contain constituents in addition to the monomers and core material such as pigments or dyes for coloring the finished product, plasticizers, fillers, and the like. The fillers provide the desirable function of reducing the cost of the final product without significantly reducing the physical properties and can improve certain properties such as fire resistance, arc resistance and the like. Suitable filler material includes powdered calcium carbonte, clay, sands, powdered metals such as aluminum and iron, metal oxides such as iron oxide, alumina, etc., powdered silica, wood flour, walnut shell flour and the like. The filler is preferably inert in the composition, that is, it should not react with any of the reactants or catalyze a reaction involving the reactants. Other additives which can be used are a suitable mold release agent or a material such as poly(methylmethacrylate), finely ground polyethylene, finely ground polystyrene and the like to impart a low profile, that is, a smooth surface, to the molded product.

It may be desirable to incorporate in the initial mixture a non-reactive plasticizer or a reactive plasticizing monomer which possesses the ability to enhance the flow characteristics during molding. Such plasticizing components include epoxidized vegetable oils such as epoxidized soy bean oil, di-2-ethylhexyl phthalate, di-octyl phthalate, dihexyl phthalate, di-isooctyl phthalate, polyethylene glycols such as those having a molecular weight between 600 and 1,000, Nadic methyl anhydride, phenylglycidyl ether, alkylglycidyl ethers, such as octylglycidyl ether, and the like.

As pointed out, polymerization of the double bond is highly exothermic. In view of this, care must be exercised in order that the material does not heat high enough in the first stage polymerization to cause a significant anhydride-epoxy, cross-linking reaction to a gel such that the intermediate resin will not properly melt or flow or cannot be easily molded. However, it may be desirable that the intermediate product contain some anhydride-epoxy bonding below the gellation stage to increase the melt viscosity of the resin when excessive fluidity during molding becomes a problem. When the fiber glass-resin mixture has been laid down in relatively thin sheets, the exothermic heat of reaction is more readily dissipated than when thick sheets are used. Furthermore, the rate of the first stage reaction and therefore the heat buildup can be partially controlled by control of the free radical initiation itself. Since chemical free radical initiators generate free radicals at different rates, polymerization can be controlled by an appropriate selection of the chemical initiator, the amount used, and the time and temperature of the polymerization reaction. If ionizing radiation is used, a reduction in the intensity of the radiation source will reduce the rate of heat buildup in the material.

In the first-stage polymerization reaction the olefinically unsaturated monomer is completely reacted to form an intermediate product which is substantially free of volatile components. This intermediate composition is dry and handleable, that is, it can be handled, cut and the like without sticking to the hands, shears, and the like, and is readily moldable. When styrene is used without filler or reinforcing fiber, a clear intermediate product is obtained which is indicative of a homogeneous material and the absence of polystyrene. Since polystyrene and styrene-maleic anhydride copolymers are mutually insoluble, their concurrent presence in the intermediate product would be indicated by opacity. This homogeneous intermediate product results in a homogeneous fully cured resin product. In contrast a non-homogeneous intermediate product would result in a non-homogeneous resin product with inferior properties. The complete insolubility of the fully cured resin product in methyl ethyl ketone also indicates the absence of polystyrene in the final product.

In preparing the reaction solution the unsaturated monoanhydride can be added to the ethylenically unsaturated monomer solvent and stirred at a mildly elevated temperature, if necessary, until solution is obtained, next the olefinically saturated polyanhydride can be added with stirring until solution is obtained, the finally the polyepoxide can be added. Alternatively, all four components can be added together with stirring until solution is obtained or the polyepoxide can be added to the solvent and then the unsaturated monoanhydride and the saturated polyanhydride. The anhydride accelerator and free radical initiator are generally added last, but prior to the first-stage reaction. Other procedures are also possible. In some instances one or more of the components may not be completely soluble in the solution. In this instance such component can be finely granulated, with the resin components then formed into a homogeneous, liquid dispersion or mixture, rather than a true solution. As a result of the fineness of the particles and the thoroughness of the dispersion, this mixture will function in the process similar to a true solution of the reacting components. The pigments, catalysts, filler and other optional components are then introduced and then the mixture can be thickened by copolymerization to form the intermediate compound, such as sheet molding compound.

The term sheet molding compound is a designation of the Society of the Plastics Industry for resin-fiber reinforced, thermosetting composition in sheet form which is designed for compression molding. This molding compound can be formed as a sheet in a continuous process by depositing dry, chopped glass fiber roving between resin-coated plastic film such as polyethylene film. The resulting sandwich is then roller kneaded and compacted to uniformly interdisperse the resin and the glass fibers and to accomplish uniform thickness. This sticky, plastic contained mixture is then thickened by copolymerization of the ethylenically unsaturated components to form the sheet molding compound. The sheet molding compound can then be cut to the desired mold shape and molded under heat and pressure to form the fully cured product.

The sheet molding compound can also be formed by a spray-up method in which the catalyzed resin in liquid form and chopped fiber glass roving are sprayed or blown simultaneously onto a surface such as a polyethylene film and covering this with a second polyethylene film. Wetting of the glass fibers by the resin solution is obtained in flight. Kneading or compaction of the sprayed up material can be utilized, if necessary, to complete the wetting of the fibers and insure uniform distribution of the resin in the fiber. Whichever method is used for preparing the sheet molding compound, it is necessary that the reinforcing fibers be sufficiently long to give the final product adequate strength but not so long that they will interfere with the flow of the resin-fiber mixture in the mold during curing. Under the influence of the heat and pressure, the resin component will soften. If it does not soften enough due to too much anhydride-epoxy cross-linking, it will not flow properly in the mold. Or if the anhydride-epoxy reaction is too rapid at the molding temperature, the resin will gel in the mold before it has flowed sufficiently to fill out the mold. If the resin softens too much, it will flow away from the reinforcing fiber during molding.

As described, a suitable anhydride-accelerator must be used in order to obtain a satisfatory second stage cure, particularly when mold curing is utilized. In order to prepare the intermediate compound without substantial anhydride-epoxy reaction, the anhydride accelerator must be substantially inactive at the conditions required for the free-radical reaction including the time and temperature of the reaction. Furthermore, adequate control of active hydrogen must be effected to insure that substantial anhydride-epoxy reaction does not occur. Therefore, an anhydride accelerator is preferably used which is substantially free of active hydrogen. As the temperature of the free radical reaction is increased, a less active anhydride accelerator is used. The relative inactivity of the anhydride accelerator in contrast with the activity of the free radical initiation is further emphasized when significant storage stability of the intermediate composition is desired. The anhydride accelerator functions by opening up the anhydride group for reaction with the epoxy group. This accelerator can suitably be a tertiary nitrogen compound, preferably a non-volatile liquid, which is incorporated into the initial reaction mixture in the amount of about 0.01 to about 10 weight percent, preferably about 0.1 to about 5 percent based on the resin components. Suitable accelerators include tertiary amines such as N-ethylmorpholine, N-aminopropylmorpholine, N,N-dimethylcyclohexylamine, benzyldimethylamine, 3-picoline, melamine, diallylmelamine and the like; imidazoles such as imidazole, 1-methylimidazole, 2-methylimidazole, 2-ethylimidazole, 1,2-dimethylimidazole, and the like; benzyltrimethylammonium chloride, dicyandiamide piperazine, and the like. A solid accelerator, such as dicyandiamide, can be finely powdered and thoroughly incorporated throughout the resin mixture. Since the presence of an anhydride accelerator for the second stage anhydride-epoxide reaction can have a significant effect on any anhydride-epoxide reaction that may take place in the first-stage copolymerization procedure or during storage of the intermediate composition, its selection, particularly with respect to its activity and the amount used, must be carefully correlated with the other components and the conditions in the first-stage copolymerization to avoid a substantial amount of such anhydride-epoxy reaction in the first stage, as described above.

The intermediate compound can be cured to an elevated temperature of about 65° to about 220° C., preferably about 140° to about 199° C. for a sufficient time to effect cure, namely, about 30 seconds to about 24 hours. The molding pressure, when utilized, generally will be between about 3 and about 200 kg./cm$^2$ and preferably about 25 to about 100 kg./cm$^2$. The cure conditions are related in part to the resin composition including the particular accelerator that is used. For suitable molding the total combined content of the reinforcing fiber and filler should be no greater than about 80 percent of the total composition. When fiber glass reinforcement is used, it will comprise from about 10 percent to about 80 percent, preferably about 20 percent to about 65 percent of the total composition. The filler will ordinarily be used in the range of about 5 percent to about 80 percent, preferably about 10 percent to about 40 percent of the total composition.

The following examples are set out to illustrate the novel process and compositions of the invention and to provide a better understanding of the details and advantages of the invention.

EXAMPLE 1

Molding compound in sheet form was prepared, molded and tested as follows: Into a 20 gallon (75 liter) stainless steel container was placed 10 kg. of liquid styrene monomer and 4.80 kg. of maleic anhydride briquettes. Mixing was accomplished by a variable speed high-shear mixer fitted with an 8 inch (20.3 cm.) sawtooth mixing head and operated at 1,750 rpm. During the mixing 10.2 kg. of a styrene-maleic anhydride copolymer having a styrene to maleic anhydride ratio of 2:1 was added and mixing was continued until all solids were dissolved. Next was added 15 kg. of Shell Epon 826, a liquid diglycidyl ether of bisphenol A.

To 10 kg. of the above solution were added one kg. of carbon tetrachloride (a chain transfer agent which lowers the molecular weight of in situ produced polymer, thereby lowering the melt viscosity of the intermediate molding compound, this results in better flow in the heated mold and lower molding pressure), 150 g. of a yellow pigment, 100 g. of N-ethyl morpholine, 25 g. of vanadium carboxylate, 300 g. of methyl ethyl ketone peroxide, and 24.2 lbs. (11 kg.) of alumina trihydrate, while mixing at 2,250 rpm. using a 4-inch (10.1 cm.) sawtooth head.

The resin-filler mix was then employed to make molding compound by using a Finn and Fram 18-inch (46 cm.) sheet molding compound machine. The machine was adjusted to produce a composite mat 12 inches (30 cm.) wide and weighing about eight ounces per square foot (2.44 kg./cm$^2$). Fiber glass content was about 28 percent and was chopped at 1 inch (2.54 cm.) length from fiber glass roving. This material was taken up in rolls and then cut into 12 in. × 16 in. pieces (30 by 40 cm.) which were stored at 100° F. (37.7° C.) for 20 hours and then stored at 50° F. (10° C.) until used. Before storage, the material was soft and pliable but non-tacky. After maturation during storage, it was solid and fairly rigid and free of volatiles with only a slight styrene odor.

Test specimens were prepared from 8 in. ×12 in. (20 × 30 cm.) panels molded at about 1,000 psi. (70.3 kg/cm$^2$) at 315° F. (157° C.), cured five minutes for 1/16 in. (1.6 mm.) and ⅛ in. (3.2 mm.) thick panels, 10 minutes for ¼ in. (6.4 mm.) and 20 minutes for ½ in. (12.7 mm.) thick panels.

The fully cured product was tested and determined to have a flexural strength of 28,000 psi. (1,970 kg./cm$^2$)

and a flexural modulus of 1.7 × 10⁶ psi. (12,000 kg./cm²) by ASTM D-790, a tensile strength of 13,000 psi. (914 kg./cm²) by ASTM D-638, an Izod impact strength of 10 foot-lbs./in. (0.545 kg.meters/cm.) by ASTM D-256 and a Barcol (934-1) hardness of 64 by ASTM D-2585.

EXAMPLE 2

A resin solution was prepared by mixing five kg. of styrene, 5.1 kg. of a styrene-maleic anhydride copolymer having a styrene to maleic anhydride ratio of 2:1 and 2.4 kg. of maleic anhydride. After solution was obtained, 7.5 kg. of Epon 826 was mixed in. To nine kg. of this solution 900 g. of carbon tetrachloride, 90 g. of N-ethyl morpholine, 22.5 g. of vanadium carboxylate, 270 g. of methyl ethyl ketone peroxide and 9.99 kg. of powdered calcium carbonate were mixed in. Composite material containing 36 percent fiber glass of one inch (2.54 cm.) was prepared on a sheet molding compound machine as described in Example 1 and matured for 20 hours at 100° F. (37.7° C.). Portions were then molded into ¼ in. (6.4 mm.) and ⅛ inc. (3.2 mm.) thick panels which were cured for 10 minutes at 320° F. (160° C.). Specimens cut from these panels possessed an average flexural strength of 38,000 psi. (2,670 kg./cm²), an average flexural modulus of 2.3 × 10⁶ psi. (1.62 × 10⁵ kg./cm²), an average tensile strength of 30,000 psi. (2,100 kg./cm²) and an average Barcol (934-1) hardness of 60.

EXAMPLE 3

A molding compound containing no mineral filler was prepared using the spray up technique. A solution of styrene, styrene-maleic anhydride copolymer and maleic anhydride was prepared as described in Example 2. To this was added 7.5 kg. of Epon 826 and two kg. of carbon tetrachloride. To 18.36 kg. of this solution were added 165.3 g. of N-ethyl morpholine, 41.3 g. of vanadium carboxylate and 495.9 g. of methyl ethyl ketone peroxide.

This resin solution was sprayed up with one inch (2.54 cm.) glass fibers onto polyethylene film to form a sheet containing 28 percent glass fibers and weighing about 14 ounces per square foot (4.27 kg./cm²). The sheet was topped with a polyethylene film and was cut into 12 by 14 in. (30 by 35.6 cm) pieces which were packaged in cellophane bags at 100° F. (37.7° C.) for 20 hours.

The resulting molding compound was a solid, hard material which contained almost no volatile components. Samples of this molding compound were molded in pressure molds at 270° F. (132° C.) for 10 minutes. The molding compound softened at the molding conditions and flowed well in the molds. One mold produced a flat bottomed pan and the other mold produced a part with numerous ribs and bosses. Samples cut from these molded parts demonstrated an average flexural strength of 22,000 psi. (1,550 kg./cm²) and an average flexural modulus of 1.1 × 10⁶ psi. (7.7 × 10⁴ kg./cm²).

EXAMPLE 4

Molding compound in sheet form was prepared as described in Example 2 at reduced styrene content. The mixture contained 1,272 g. of styrene, 2,550 g. of the 2:1 styrene-maleic anhydride copolymer, 1,200 g. of maleic anhydride, 3,750 g. of Epon 826, 878 g. carbon tetrachloride, 87.7 g. N-ethyl morpholine, 21.9 g. of vanadium carboxylate, 263 g. of methyl ethyl ketone peroxide and 9,650 g. of powdered calcium carbonate. The composite was prepared in the sheet molding compound machine with 32 percent of a one inch (2.54 cm.) fiber glass content. Molded panels were found to have an average flexural strength of 25,900 psi. (1,820 kg./cm²), an average flexural modulus of 1.5 × 10⁶ psi. (1.05 × 10⁵ kg./cm²) and an Izod impact strength of 11.2 foot-lbs./inch (0.61 kg.meters/cm.).

EXAMPLE 5

Molding compound was prepared as in Example 2 except that the styrene and mineral filler content was increased. The resin solution continued 7.17 kg. of styrene, 7.29 kg. of the 2:1 styrene-maleic anhydride copolymer, 3.51 kg. of maleic anhydride and 10.71 kg. of Epon 826. To seven kg. of this solution were added 1,075 g. of styrene, 807.5 g. of carbon tetraclorice, 224 g. of zinc stearate mold release agent, 224 g. of N-ethyl morpholine, 20 g. of vanadium carboxylate, 242 g. of methyl ethyl ketone peroxide and 16.15 kg. of powdered calcium carbonate. The composite was made in a sheet molding compound machine at a 21 percent fiber glass content and was stored at 100° F. (37.7° C.) for 20 hours. Molded specimens exhibited an average flexural strength of 23,000 psi. (1,610 kg./cm²) and an average flexural modulus of 1.7 × 10⁶ psi. (1.2 × 10⁵ kg./cm²).

EXAMPLE 6

Molding compound was prepared as in Example 5 except that the styrene content was further increased. The resin solution contained nine kg. of styrene, 3.74 kg. of the 2:1 styrene-maleic anhydride copolymer, 1.76 kg. of maleic anhydride and 5.5 kg. of Epon 826. To nine kg. of this solution were added 900 g. of carbon tetrachloride, 270 g. of zinc stearate mold release agent, 90 g. of N-ethyl morpholine, 22.5 g. of vanadium carboxylate, 270 g. of methyl ethyl ketone peroxide and 18.1 kg. of powdered calcium carbonate. The composite was made in a sheet molding compound machine at a 21 percent fiber glass content and was stored at 100° F. (37.7° C.) for 20 hours. Molded specimens exhibited an average flexural strength of 25,000 psi. (1,760 kg./cm²) and an average flexural modulus of 1.6 × 10⁶ psi. (1.12 × 10⁵ kg./cm²).

EXAMPLE 7

Molding compound containing mineral filler was prepared using the spray-up technique similar to Example 3. a solution of 7.84 kg. of styrene, 3.24 kg. of 2:1 styrene-maleic anhydride copolymer and 1.56 kg. of maleic anhydride was prepared. To this was added 4.76 kg. of Epon 826. To 7.5 kg. of this resin solution were added 750 g. of styrene, 413 g. of carbon tetrachloride, 82.5 g. of N-ethyl morpholine, 20.6 g. of vanadium carboxylate, 247.5 g. of methyl ethyl ketone peroxide, 247.5 g. of zinc stearate mold release agent and 14.5 kg. of powdered calcium carbonate.

This resin solution was sprayed up with one inch (2.54 cm.) glass fibers onto polyethylene film to form a sheet containing 19 percent glass fibers. The sheet was topped with a polyethylene film and was matured at 100° F. (37.7° C.) for 20 hours.

Samples of this molding compound were molded in pressure molds at 270° F. (132° C.) for 10 minutes. Molded test specimens has an average flexural strength of 21,400 psi. (1,500 kg./cm²) and an average flexural modulus of 1.9 × 10⁶ psi. (1.33 × 10⁵ kg./cm²).

EXAMPLE 8

Molding compound was prepared by spray-up similar to Example 7 except that no carbon tetrachloride was present and 3-picoline was used as the cross-linking accelerator. To a solution of 9.56 kg. of styrene, 3.24 kg. of 2:1 styrene-maleic anhydride copolymer and 1.56 kg. of maleic anhydride were added 4.76 kg. of Epon 826 g. of zinc stearate mold release agent. To 7.5 kg. of this mixture were added 16 g. of 3-picoline, 16 g. of vanadium carboxylate and 16 kg. of powdered calcium carbonate.

A composite was sprayed-up by injecting methyl ethyl ketone peroxide into the filled resin at the nozzle of the spray gun during spray-up. The peroxide catalyst was estimated to comprise three percent based on the resin and the glass content was about 18 percent. After storage for 20 hours at 100° F. (37.7° C.) samples molded at 325° F. (162° C.) for different cure times exhibited the following properties.

|  | 10 min. cure | 30 min. cure |
| --- | --- | --- |
| Flexural strength, |  |  |
| psi. | 14,000 | 16,000 |
| kg./cm$^2$ | 980 | 1,120 |
| Flexural modulus, |  |  |
| psi. | $2.2 \times 10^6$ | $2.1 \times 10^6$ |
| kg./cm$^2$ | $1.55 \times 10^5$ | $1.47 \times 10^5$ |
| Izod impact, |  |  |
| ft. lbs./in. | 10 | 10 |
| kg.meters/cm. | 0.545 | 0.545 |

EXAMPLE 9—12

Molding compound was prepared by the bulk mixing of ¼ in. (6.3 mm.) chopped glass fibers and mineral filler into resin formulations having varying carbon tetrachloride content. A base resin was prepared from 2.82 kg. of styrene, 3.24 kg. of 2:1 styrene-maleic anhydride copolymer, 1.56 kg. of maleic anhydride and 4.76 kg. of Epon 826. To 1,514 g. of this solution was added 54 g. of zinc stearate mold release agent to form the base resin.

| Test solutions were prepared as follows: | | | |
| --- | --- | --- | --- |
| Ex. | Base Resin | Styrene | CCl$_4$ |
| 9 | 252.4 g. | 47.6 g. | none |
| 10 | 252.4 g. | 39.0 g. | 15 g. |
| 11 | 252.4 g. | 30.5 g. | 30 g. |
| 12 | 252.4 g. | 22.3 g. | 45 g. |

To each of these solutions were added three g. of N-ethyl morpholine, 0.75 g. of vanadium carboxylate, nine g. of methyl ethyl ketone peroxide, 600 g. of powdered calcium carbonate and 225 g. of the chopped fiber glass. The filled resin and fiber glass were placed in polyethylene bags, and the fiber glass was thoroughly wet-out by manual kneading and repeated passes with a roller. After wet-out of the fibers the composite was formed into sheets weighing about 14 ounces per square foot (4.27 kg./m$^2$), packaged in cellophane, and stored at 100° F. (37.8° C.) for 20 hours. Afterwards samples were molded at 320° F. (160° C.) in an ASTM D731-57 cup test mold and cured for 10 minutes. Barcol (934-1) hardness was measured per samples 9, 10 and 11 immediately after the mold was opened and while the samples were hot. For sample 12 Barcol hardness was measured after the molded sample had cooled to room temperature. In all cases the molding compound completely filled out the part, flowed with apparently good uniformity, and cured to a hard state. It was observed that with increasing carbon tetrachloride concentration the pressure required to close the mold and fill out the cup decreased. Hot Barcol hardness for 9 and 10 was 10 to 20 and for 11 was 5. Cold Barcol hardness for 12 was 60 to 65.

EXAMPLE 13

A molding compound was prepared by forming a solution containing 3,015 g. of styrene, 1,449 g. of maleic anhydride and 4,527 g. of Epon 826. To this was added 18 g. of 1-methyl imidazole, 135 g. of 2,2′azobis(2,4-dimethylvaleronitrile) and 44.1 g. of a powdered silica. This mixture was compounded with 58 percent of a one-inch (2.54 cm.) fiber glass on the sheet molding compound machine. The material was maturated in a room heated to 65° and developed an exotherm of 115° C. compared with a normal exotherm of about 90°–95° C. Ten minutes after the exotherm had developed, the material was removed from the heated room and was allowed to air cool to room temperature. It was then compression molded at 165° C. for 15 minutes in a pan mold to a molded product having a flexural strength of 40,000 psi. (2,820 kg./cm$^2$). Its surface was of a poorer quality than the preceding examples which indicates that better control of the polymerization procedures for this formulation is desirable.

EXAMPLE 14

An 897 g. sample of a filled resin mixture containing 150 g. of Epon 826 using the same components and proportions as used in Example 2 was placed in a polyethylene bag with 110 g. of ¼ inch (6.3 mm.) chopped fiber glass. After wet-out of the fibers by manual kneading, the composite was formed into sheets weighing about 14 ounces per square foot (4.25 kg./m$^2$), packaged in cellophane, and stored at 100° F. (37.8° C.) for about 18 hours. A portion of the thickened material was compression molded at 160° C. for 5 minutes in a mold that produced a flat-bottomed pan with a bottom diameter of about 5.25 inches (13.5 cm.). The molding compound completely filled the mold with good uniformity and cured to a hard, infusible state. The Barcol (934-1) hardness taken after the mold was opened was 10 to 20. The Barcol (934-1) hardness at room temperature was found to be 60-65.

EXAMPLE 15

A filled, reinforced resin mixture was prepared, thickened and cured using the procedures, proportions and conditions described in Example 14 except that it contained, as the polyepoxide component, 146 g. of Dow Chemical Company DEN 431, a liquid epoxy novolac having an epoxy equivalent weight of 172–179. The Barcol (934-1) hardness of the cured material was also 60–65.

EXAMPLE 16

A filled, reinforced resin mixture was prepared, thickened and cured using the proportions, procedures and conditions as described in Example 14 except that it contained as the polyepoxide component, 75 g. of Epon 826 and 96 g. of Ciba Products Company ECN 1280, a solid epoxy resin having an epoxy equivalent weight of 230 and it was cured for 50 minutes. The Barcol (934-1) hardness of the cured product was 60–65.

EXAMPLE 17

A filled reinforced resin mixture was prepared, thickened and cured using the proportions, procedures and conditions described in Example 14 except that it contained as the polyepoxide component, 113 g. of Union Carbide Corporation ERL4221, a cycloaliphatic epoxide having an epoxy equivalent weight of 133 and it was cured for 100 minutes. The Barcol (934-1) hardness was 67–72.

EXAMPLE 18

A filled, reinforced resin mixture was blended as described in Example 14 except that 150 g. of Dow Chemical Company DEN 438, a semi-solid epoxy novolac resin having an epoxy equivalent value of 176 to 181, was used as the polyepoxide. The mixture was spread out as a sheet and was thickened for about 18 hours at 100° F. (37.8° C.). A portion was then compression molded in the flat-bottomed pan mold for five minutes. Upon opening the mold, the Barcol (934-1) hardness of the hot molded product was determined to be 22 indicating that the cure had been completed.

EXAMPLE 19

A 909 g. sample of a filled resin mixture using the same components and proportions as used in Example 2 except that half of the styrene-maleic anhydride copolymer (51 g.) was replaced by 63 g. of Nadic methyl anhydride. The filled resin mixture was mixed with 110 g. of (6.3 mm.) chopped fiber glass and heated in sheet form at 100° F. (37.8° C.) for eight hours. After molding at 160° C. in the flat-bottomed pan mold for five minutes with good flow and uniformity in the mold, the molded part was removed from the mold and cooled. Its room temperature Barcol (934-1) hardness was found to be 62–67.

EXAMPLE 20

A molded product was prepared as described in Example 19 except that 55 g. of hexahydrophthalic anhydride was substituted for the Nadic methyl anhydride and 96 g. of ECN 1280 replaced half (75 g.) of the Epon 826 in the polyepoxide component. The Barcol (934-1) hardness of the molded product was 64–72 at room temperature.

EXAMPLE 21

A molding compound is sheet form was prepared on a sheet molding compound machine to contain 47 percent of one inch (2.54 cm.) glass fibers. The resin portion was prepared by mixing 12 kg. of a solution prepared from 6.33 kg. of styrene, 6 kg. of maleic anhydride, 12.75 kg. of the 2:1 styrenemaleic anhydride copolymer and 18.75 kg. of Epon 826 with 120 g. of N-ethyl morpholine, 30 g, of vanadium carboxylate, and 360 g. of methyl ethyl ketone peroxide. The composite sheet was matured (thickened) at 55° C. for 2.5 hours. When compression molded in the pan-shaped mold at 157° C., the molding compound flowed with apparent good uniformity, filled out the mold, and cured in five minutes to a hard infusible state with a Barcol (934-1) hardness of 47 measured immediately after the mold was opened and while the molded part was hot. Specimens cut from the bottom portion of the pan exhibited, at room temperature, a flexural strength of 43,000 psi. (3,020 kg./cm$^2$), a tensile strength of 28,000 psi. (1,970 kg./cm$^2$), and a notched Izod impact strength of 31.9 foot-lbs./in. (1.74 kg.meters/cm.).

EXAMPLE 22

A resin solution was prepared by first mixing 12.5 kg. of styrene and 6 kg. of maleic anhydride briquettes. After the maleic anhydride has been broken into small particles, 18.75 kg. of Epon 826 was added. This was followed by the addition of 12.75 kg. of the 2:1 styrene-maleic anhydride copolymer. Mixing was continued for about one hour after which all solids were in solution. To 20 kg. of this solution were added 40 g. of 1-methylimidazole, 300 g. of fumed silica, and 300 g. of 2,2'azobis(2,4-dimethylvaleronitrile) catalyst. The composite was prepared on the sheet molding compound machine with 62 percent of a one-half inch (1.27 cm.) fiber glass content. The composite was stored in sheet form in single layers at 65° C. for 40 minutes. Afterwards, samples were compression molded at about 300°–325° F. (149°–163° C.) for about five minutes. Typical properties for the molded product are a flexural strength of 54,000 psi. (3,800 kg./cm$^2$), a tensile strength of 24,000 psi. (1,690 kg./cm$^2$), an Izod impact strength of 36 foot-lbs./in. (1.96 kg.meters/cm.) and a Barcol (934-1) hardness of 67. The material also possessed a flexural strength at 150° C. of 30,000 psi. (2,110 kg./cm$^2$) and a heat deflection temperature greater than 300° C. (ASTM D-648). Other samples stored for 1 day and 10 days at 26° C. and for 60 days at 5° C. molded with uniform flow to completely fill out the mold producing molded products which exhibited a Barcol (934-1) hardness measured after the mold was opened on the hot material of 52, 52 and 45, respectively.

EXAMPLE 23

Molding compound was prepared as in Example 22 except that fumed silica was eliminated, calcium carbonate and carbon tetrachloride were added, a different catalyst was used, and fiber glass length was increased from one-half inch to one inch. The initial mixture contained 17.5 kg. of styrene, 8.4 kg. of maleic anhydride, 26.25 kg. of Epon 826, and 17.85 g. of the 2:1 styrene-maleic anhydride copolymer. To 15 kg. of this mixture were added 750 g. of carbon tetrachloride, 30 g. of 1-methylimidazole, 262,5 g. of dicyclohexyl peroxydicarbonate catalyst, and 7,875 g. of powdered calcium carbonate. The composite was prepared on the sheet molding compound machine with 44 percent of a one inch (2.54 cm.) fiber glass content. The composite was stored at 65° C. for 30 minutes. Afterwards, samples were compression molded at 300°–325° F. (149°–163° C.) for about five minutes and tested. Typical properties for the molded product include a flexural strength of 42,000 psi. (2,950 kg./cm$^2$), a tensile strength of 20,000 psi. (1,410 kg./cm$^2$), an Izod impact strength of 14 foot-lbs./in. (0.763 kg.meters/cm.) and a Barcol (934-1) hardness of 73. This material also exhibited a water absorption of 0.20 percent after 48 hours at 50° C. and a heat deflection temperature greater than 300° C.

EXAMPLE 24

Molding compound was prepared as in Example 23 except that hydrated alumina was substituted for calcium carbonate. The initial mixture was as described in Example 23. To 15 kg. of the mixture were added 1.5 kg. of carbon tetrachloride, 30 g, of 1-methylimidazole, 300 g. of dicyclohexyl peroxydicarbonate catalyst, and 13.2 kg. of hydrated alumina. The composite was prepared on the sheet molding compound machine with 34 percent of a one-inch (2.54 cm.) fiber glass content. After storage at 65° C. for 30 minutes, samples of the molding compound were compression molded at 300°–325° F. (149°–163° C.) for about five minutes and tested. Typical properties for the molded product include a flexural strength of 31,000 psi. (2,180 kg./cm$^2$), a tensile strength of 15,000 psi. (1,050 kg./cm$^2$), and Izod impact strength of 12 foot-lbs./in. (0.65 kg.meters/cm.), a Barcol (934-1) hardness of 64 and an electrical arc resistance of 180 seconds (ASTM D-495).

EXAMPLE 25

Molding compound was prepared by the bulk mixing of ¼ inch (6.3 mm) chopped glass fibers with a resin formulation containing dicyandiamide as an accelerator for curing. An initial resin mixture was prepared from 5,000 g. of styrene, 5,100 g. of the 2:1 styrene-maleic anhydride copolymer, 2,400 g. of maleic anhydride, and 7,500 g. of Epon 826. To a 3,000 g. portion of the mixture were added 180 g. of styrene, 183.6 g. of the 2:1 styrene-maleic anhydride copolymer, and 86.4 g. of maleic anhydride. All solids were dissolved and the solution was thoroughly mixed. To a 250 g. portion of this solution were added 2.75 g. of 2,2'-azobis(2,4-dimethylvaleronitrile) catalyst, and 375 g. of a 60:40 mixture of Epon 826/dicyandiamide which had been prepared by dispersing dicyandiamide in Epon 826 on a three-roll mill. A 240 g. portion of this resin mixture was added to a polyethylene bag containing 160 g. of ¼ inch (6.3 mm.) fiber glass. The composite was handled and packaged as in Example 14 and it was stored at 55° C. for 20 minutes. The molding compound was compression molded in the pan mold for 15 minutes at 165° C. Flexural strength of specimens cut from the pan averaged 16,300 psi. (1,150 kg./cm$^2$).

EXAMPLE 26

Molding compound was prepared and divided into two portions: (1) one portion was placed in a 10° C. environment for three days and then was molded; (2) the other portion was stored for 2 hours at 60° C., subsequently was placed in a 10° C. environment for 3 days and then was molded. The initial resin mixture was prepared as in Example 22 and comprised 6.25 kg. of styrene, 3 kg. of maleic anhydride, 9,375 g. of Epon 826, and 6,375 g. of the 2:1 styrene-maleic anhydride copolymer. Added to 1,200 g. of this mixture were 120 g. of pigment, 120 g. of N-ethyl morpholine, 30 g. of vanadium carboxylate, and 360 g. of methyl ethyl ketone peroxide. The composite was prepared on the sheet molding compound machine with 45 percent of a one-inch (2.54 cm.) fiber glass content. After being sealed in cellophane, two portions were stored and thickened under different conditions as described above. When compression molded in the pan mold, samples from each of the two portions flowed with apparently good uniformity and cured in five minutes to a hard infusible state. Barcol (934-1) hardness was measured immediately after the mold was opened and while the samples were still hot and was found to have values of 10 for the portion stored at 10° C. and 35 for the one stored first a 60° and then at 10° C. Flexural strengths for test specimens taken from the molded pans were found to be 42,000 and 45,000 psi., respectively (2,950 and 3,170 kg./cm$^2$).

EXAMPLE 27

A resin solution was prepared by mixing 48 g. of methyl methacrylate, 75 g. of Epon 826, 51 g. of the 2:1 styrene-maleic anhydride copolymer, 24 g. of maleic anhydride andl 6 g. of methyl ethyl ketone peroxide for 3 minutes, Thirty drops of vanadium neodecanoate were added to the clear, yellow liquid after which it was transferred to a polyethylene bowl, filling it to a depth of ¾ inch (19 mm.). An exothermic reaction occurred, peaking in about 30 minutes. The product was a clear amber solid, soluble in acetone. Analysis of the material showed that methyl methacrylate monomer was fully consumed and that all of it was incorporated in a methyl methacrylate-maleic anhydride copolymer.

An identical solution was prepared except that one g. of 2-methylimidazole was incorporated into the formulation. After the solution had thickened as described above, it was cured at 325° F. (163° C.) for 25 minutes to a clear amber solid having a Shore D hardness of 90. This cured product was insoluble in acetone and was infusible.

EXAMPLE 28

A solution was prepared by mixing 75 g. of Epon 826, 43. g. of vinyl acetate, 51 g. of 2:1 styrene-maleic anhydride copolymer, 24 g. of maleic anhydride and two grams of 2,2'-azobis(2,4-dimethylvaleronitrile). The solution was placed in a polyethylene bowl and heated in an oven at 45° C. for two hours. The resulting product was a pliable, flexible mass, insoluble in acetone but soluble in methyl ethul ketone. Analysis disclosed that the vinyl acetate was completely consumed in the formation of a vinyl acetate-maleic anhydride copolymer.

This procedure was repeated except that one g. of 2-methylimidazole was incorporated into the initial solution. The thickened intermediate was cured at 315° F. (157° C.) for 30 minutes to a dark, porous material having a Shore D hardness of 85. It was insoluble in acetone and was infusible.

EXAMPLE 29

A mixture of 50 g. of Epon 826, 46.2 g. of 3-chlorostyrene, 34 g. of 2:1 styrene-maleic anhydride copolymer, 16 g. of maleic anhydride and 1.3 g. of 2,2'-azobis(2,4-dimethylvaleronitrile) was blended into a solution. When heated in a polyethylene bowl in an oven at 45° C. for 30 minutes, a hard, light yellow, acetone-soluble product was obtained. Analysis showed that 90 percent of the 3-chlorostyrene had copolymerized with the maleic anhydride.

The procedure was repeated with the addition of one g. of 2-methylimidazole into the formulation. The thickened intermediate material was cured to a hard, acetone-insoluble, infusible product.

EXAMPLE 30

A clear solution was prepared by thoroughly blending 50 g. of styrene, 75 g. of Epon 826, 51 g. of the 2:1 styrenemaleic anhydride copolymer and two g. of 2,2'-azobis(2,4-dimethylvaleronitrile). The solution was placed in a polyethylene bowl and heated overnight at 115° F. (46° C.). The resulting material was non-fluid but gummy and showed a weight loss of 1.7 g. It was heated for an additional hour at 145° F. (62.8° C.). The resulting product was non-gummy and flexible. Analysis disclosed substantially complete consumption of styrene monomer and indicated that the major portion had reacted with the styrene-maleic anhydride copolymer by graft polymerization.

EXAMPLE 31

A resin mixture was prepared by mixing 175 g. of styrene and 84 g. of maleic anhydride in a blender for two minutes. Mixing was continued for 10 minutes after 262 g. of Epon 826 was added to the mixture. A 250 g. portion of this resin mixture was placed in a blender and 0.63 g. of 1-methylimidazole and 3.25 g. of 2,2'-azobis(2,4-dimethylvaleronitrile) were mixed in. 240 g. of this mixture were added to a polyethylene bag containing 190 g. of ¼ inch (6.3 mm.) glass fibers. After wet-out of the fibers by manual kneading, the resin-glass mixture was formed into a flat composite of about ⅛ inch (3.2 mm.) thickness between two cellophane sheets. This composite was placed for 10 minutes between two metal plates, 3 feet by 1.5 feet by ⅛ inch (91.5 cm. by 45.7 cm. by 3.2 mm) in dimension in an oven heated to 200° F. (93.3° C.). It was then removed and cooled to 40° F. (4.4° C.). The material was solid and fairly rigid. After 24 hours, a 120 g. portion of this composite was compression molded in the pan-shaped mold at 340° F. (171.1° C.). The resin-glass composite softened readily and flowed in the mold to a cure in five minutes. The flexural strength of specimens cut from the pan-shaped product averaged 11,600 psi. (818 kg./cm$^2$).

EXAMPLE 32

A cured resin product was prepared as in Example 31 except that the catalyst was reduced from 3.25 g. to 2.5 g. The average flexural strength of cured specimens was 11,200 psi. (787 kg./cm$^2$).

EXAMPLE 33

A cured resin product was prepared as described in Example 31 except that 125 g. of powdered calcium carbonate was mixed with a 250 g. portion of the resin mixture in addition to the catalyst and accelerator. A 240 g. portion of this filled resin was then mixed with 190 g. of glass fibers and the composite was thickened and cured as described. The average flexural strength of this product was 15,950 psi (1,120 kg./cm$^2$).

EXAMPLE 34

A cured resin product was prepared as described in Examplel 33 except that the catalyst was reduced from 3.25 g. to 2.5 g. The average flexural strength of samples taken from the cured product was 17,100 psi. (1,200 kg./cm$^2$).

EXAMPLE 35

A cured resin product was prepared using the same procedures and conditions as described in Example 31 but using the following amounts of the various components. The initial resin mixture was prepared from 275 g. of styrene, 132 g. of maleic anhydride and 244 g. of Epon 826. A 300 g. portion of this mixture was mixed with 0.75 g. of 1-methylimidazole accelerator and 3.0 g. of 2,2'-azobis (2,4-dimethylvaleronitrile) catalyst. A 200 g. portion of this resin mixture was mixed with 100 g. of the ¼ inch (6.3 mm.) glass fibers. The average flexural strength of cured specimens was 16,600 psi. (1,170 kg./cm$^2$).

EXAMPLE 36

A cured resin product was prepared as described in Example 35 except that 150 g. of powdered calcium carbonate was mixed with a 300 g. portion of the resin mixture together with the catalyst and accelerator. A 200 g. portion of this filled resin was then mixed with 100 g. of glass fibers and thickened, then cured as described. The average flexural strength was 18,600 psi. (1,310 kg./cm$^2$).

EXAMPLE 37

A resin-glass fiber mixture was prepared without anhydride accelerator. The resin solution was prepared from 7.5 kg. of styrene, 7.65 kg. of 2:1 styrene-maleic anhydride copolymer, 3.6 of maleic anhydride and 11.25 kg. of Epon 8.26. To 12 kg. of this solution were added 24 g. of vanadium carboxylate and 360 g. of methyl ethyl ketone peroxide. The composite was made in a sheet molding compound machine at a 57 percent glass fiber content and was stored at 90° F. (32.2° C.) for 21.5 hours becoming hard and fairly rigid with only a slight styrene odor. The material was then refrigerated at about 40° F. (4.4° C.). Samples were molded in the pan mold after refrigeration for 3 hours, 1 day, 2 days and 3 days at 320° F. (160° C.) and 10 minutes, with a second two day sample held at this molding temperature for 30 minutes. After molding, every molded sample was soft and sticky while still hot. The molded material hardened upon cooling but measured zero Barcol (934-1) hardness, being no harder than the thickened material. These molded samples were rough in surface texture, whitish, possessed an uncured odor and appearance with free fibers clearly visible at the surface and softened upon reheating. There was no appearance of significant cross-linking reaction.

In like manner a thickened, moldable intermediate is produced when appropriate amounts, as described herein, of styrene, methylmaleic anhydride, a diglycidyl ether of bisphenol A, a 1:1 styrene-maleic anhydride copolymer and pyridine are heated to about 45° C. in the presence of t-butyl peroxypivalate. Also a thickened, moldable intermediate is produced when appropriate amounts of styrene, chloromaleic anhydride, a diglycidyl ether of bisphenol A, a 3:1 styrene-maleic anhydride copolymer and N-methylpiperazine are heated to about 45° C. in the presence of 2-t-butylazo-2-cyano-4-methoxy-4-methylpentane.

In the above examples the flexural strengths were determined in accordance with ASTM D-790, the tensile strengths in accordance with ASTM D-638, the Izod impact strength in accordance with ASTM D-256, the Barcol (934-1) hardness in accordance with ASTM D-2585 and the Shore D hardness in accordance with ASTM D-2240. The Barcol (934-1) hardness of the hot, freshly molded material was used as a simple screening determination of the completeness of the resin cure. We had determined that the absence of a hardness reading of the hot product indicated an incomplete cure while the presence of a reading of the hot product indicated a complete cure. Because of rapid and differential cooling, the hardness reading of the hot material was determined to have no greater significance.

As pointed out above, the anhydride accelerator is substantially inactive during the copolymerization reaction. We have discovered that the nitrogen containing anhydride accelerators which are substantially inactive during the copolymerization reaction are suitable for use as accelerators herein. The preferred accelerators are tertiary nitrogen compounds particularly those in which one or more tertiary nitrogen atoms are in a ring structure including pyridine and its mono- and di-lower alkyl-substituted derivatives, N-lower alkyl-substituted imidazole, N-lower alkyl-substituted morpholine, N-lower alkyl-substituted piperidine, N,N-di-lower alkyl-substituted piperazine, and the like. Also included are the compounds containing tertiary nitrogen atoms in which the ring is attached to the nitrogen atom with one bond including N,N-di-lower alkylcyclohexylamine, benzyl di-lower alkylamine, benzyl tri-lower alkylammonium chloride and the like. We have further discovered that nitrogen containing anhydride accelerators can be used successfully in which there is labile hydrogen attached to the nitrogen, especially when used in minor amounts or with particular care, to avoid substantial anhydride-epoxy reaction in the copolymerization reaction, although the intermediate product containing these accelerators tends to be less storage stable. This group includes as suitable accelerators imidazole, 2-methylimidazole, morpholine, N-aminopropylmorpholine, piperidine, piperazine, dicyandiamide, melamine, diallylmelamine, and the like. As used herein, lower alkyl includes methyl, ethyl, propyl, and butyl.

Many analyses of the thickened intermediate and the fully cured product involving styrene and maleic anhydride as the vinyl reactants have revealed no evidence of polystyrene notwithstanding the fact that a substantial molar excess of styrene to maleic anhydride was used in the initial resin mixture. Evidence strongly suggests that the excess styrene reacts with the styrene-maleic anhydride copolymer present in the mixture by graft polymerization forming relatively short styrene-based chains. There is also some evidence which indicates that during the first-stage reaction free styrene and free maleic anhydride disappear from the system in an approximate 1:1 molar ratio until the free maleic anhydride was fully reacted and following this any unreacted styrene reacted further until it was fully reacted.

The cured resins prepared by the procedure described herein possess excellent properties for a wide variety of uses. The reinforced molded products possess exceptional mechanical properties including exceptionally high tensile and flexural strengths and excellent retention of these properties at elevated temperatures. The electrical characteristics are excellent including the retention of the electrical properties upon exposure to moisture and heat. The reinforced thickened compositions can be readily compression molded into complex, detailed shapes with exceptionally uniform glass fiber distribution throughout at comparatively short cure times.

It is to be understood that the above disclosure is by way of specific example and that numerous modifications and variations are available to those of ordinary skill in the art without departing from the true spirit and scope of the invention.

We claim:

1. A method of forming a handleable, thermosettable composition which comprises forming a homogeneous liquid resin mixture substantially free of active hydrogen comprising
   a. about five to about 80 weight percent based on the total resin components of an olefinically unsaturated monomer selected from styrene, ring substituted chloro-, bromo or lower alkylstyrenes, lower alkylacrylates, lower alkylmethacrylates, vinyl acetate, acrylonitrile, vinyl chloride, vinyl bromide and vinylidene chloride;
   b. an anhydride component consisting of
      1. an olefinically unsaturated monoanhydride selected from maleic anhydride, chloromaleic anhydride, methylmaleic anhydride, ethylmaleic anhydride, dichloromaleic anhydride, dimethylmaleic anhydride, n-butylmaleic anhydride, phenylmaleic anhydride, diphenylmaleic anhydride, chloromethylmaleic anhydride, bromophenylmaleic anhydride and itaconic anhydride, the molar ratio of the olefinically unsaturated monomer (a) to the olefinically unsaturated monoanhydride being from about 0.5:1 to about 8:1;
      2. a saturated polyanhydride comprising the copolymer having between two and about 500 repeating units and prepared from one to 10 mols of said unsaturated monoanhydride (1) per mol of said olefinically unsaturated monomer (a) or prepared from equimolar amounts of said unsaturated monoanhydride (1) and one or more two to 20 carbon 1-alkenes or halogen-substituted 1-alkenes; and
      3. a saturated monoanhydride selected from phthalic anhydride, hexahydrophthalic anhydride, methyltetrahydrophthalic anhydride, dodecenylsuccinic anhydride, chlorendic anhydride, and a mixture of methyl bicyclo (2.2.1)-heptane-2,3-dicarboxylic anhydride isomers;
      4. the ratio of the anhydride equivalents of said olefinically unsaturated monoanhydride (1) to the sum of the total anhydride equivalents in the resin solution being from about 0.2:1 to about 1:1 and the ratio of anhydride equivalents in said saturated polyanhydride (2) to the anhydride equivalents in said saturated monoanhydride (3) being at least about 1:1;
   c. an epoxy component substantially free of active hydrogen consisting of
      1. an epoxy resin having a 1,2-epoxy equivalent value greater than one which is soluble in the resin solution or is capable of forming a homogeneous dispersion in the resin solution and
      2. a monoepoxy compound,
      3. the ratio of epoxy equivalents in the epoxy resin to the epoxy equivalents in the monoepoxy compound being at least 1:1 and an A/E ratio of total anhydride equivalents to total epoxy equivalents in the resin solution of about 0.1:1 to about 2.5:1; and
   d. from about 0.01 to about 10 weight percent of an anhydride accelerator which is substantially inactive during the copolymerization reaction of said olefinically unsaturated monomer (a) and said anhydride component (b); and copolymerizing said olefinically unsaturated monomer (a) and said anhydride component (b) by free radical means at a temperature up to about 150° C. without substantial reaction of the anhydride groups with the epoxide groups present in the resin mixture whereby a handleable, thermosettable composition comprising a homogeneous mixture of polyanhydride molecules, polyepoxide molecules and anhydride accelerator is obtained.

2. The handleable, thermosettable composition produced by the method of claim 1.

3. A method in accordance with claim 1 in which a fibrous substrate is incorporated into said liquid mixture.

4. The handleable, thermosettable composition produced by the method of claim 3.

5. A method in accordance wit claim 1 in which said free radical means comprises a chemical free radical initiator.

6. A method in accordance with claim 1 in which the anhydride accelerator is a tertiary nitrogen compound.

7. A method in accordance with claim 1 in which the liquid resin mixture contains from about 10 to about 60 weight percent of said olefinically unsaturated monomer (a), the mol ratio of said olefinically unsaturated monomer (a) to the olefinically unsaturated monoanhydride (1) is between about 1:1 and about 4.5:1, the said ratio of anhydride equivalents of said olefinically unsaturated monoanhydride (1) to the sum of the total anhydride equivalents in the resin solution is from about 0.4:1 to about 0.9:1, and the A/E ratio is between about 0.3:1 and about 1.5:1.

8. A method in accordance with claim 1 in which the liquid resin mixture contains from about 15 to about 50 weight percent of said olefinically unsaturated monomer (a) the mol ratio of said olefinically unsaturated monomer (a) to the olefinically unsaturated monoanhydride (1) is between about 1:1 and about 3:1, the said ratio of anhydride equivalents of said olefinically unsaturated monoanhydride (1) to the sum of the total anhydride equivalents in the resin solution is from about 0.5:1 to about 0.8:1 and the A/E ratio is between about 0.5:1 and about 1.5:1.

9. A method of forming a handleable, moldable composition which comprises
forming a homogeneous liquid resin mixture substantially free of active hydrogen comprising
  a. about five to about 80 weight percent styrene based on the total resin components;
  b. an anhydride component consisting of
    1. maleic anhydride in a molar ratio of styrene to maleic anhydride of about 0.5:1 to about 8:1;
    2. a styrene-maleic anhydride copolymer having between two and about 500 repeating units and a styrene to maleic anhydride ratio between about 1:1 and about 10:1; and
    3. a saturated monoanhydride selected from phthalic anhydride, hexahydrophthalic anhydride, methyltetrahydrophthalic anhydride, dodecenylsuccinic anhydride, chlorendic anhydride, and a mixture of methyl bicyclo (2.2.1) heptane-2, 3-dicarboxylic anhydride isomers;
    4. the ratio of anhydride equivalents of said maleic anhydride to the sum of the anhydride equivalents in the anhydride component (b) being between about 0.2:1 and about 1:1 and the ratio of anhydride equivalents in said styrene-maleic anhydride copolymer to the anhydride equivalents in said saturated monoanhydride (3) being at least about 1:1;
  c. an epoxy component substantially free of active hydrogen consisting of
    1. an epoxy resin having a 1,2-epoxy equivalent value greater than one which is soluble in the resin solution or is capable of forming a homogeneous dispersion in the resin solution, and
    2. a monoepoxy compound,
    3. the ratio of epoxy equivalents in the epoxy resin to the epoxy equivalents in the monoepoxy compound being at least 1:1 and an A/E ratio of total anhydride equivalents to total epoxy equivalents in the resin solution of about 0.1:1 to about 2.5:1, and
  d. from about 0.01 to about 10 weight percent of an anhydride accelerator which is substantially inactive during the copolymerization reaction of said styrene with said anhydride component (b);
wetting reinforcing fibers with said mixture, and
copolymerizing said styrene and said anhydride component (b) by free radical means at a maximum temperature up to about 150° C. to form styrene-maleic anhydride copolymer and without substantial reaction of the anhydride groups with the epoxy groups present in the resin mixture does not take place whereby a handleable, thermosettable, moldable composition comprising a homogeneous resin mixture of styrene-maleic anhydride copolymer molecules, polyepoxide molecules and anhydride accelerator is obtained.

10. The handleable, thermosettable, moldable composition produced by the method of claim 9.

11. A method in accordance with claim 9 in which said free radical means comprises a chemical free radical initiator and the said anhydride accelerator is a tertiary nitrogen compound.

12. A method in accordance with claim 9 in which the ratio of styrene (a) to maleic anhydride (1) is about 1:1 to about 4.5:1; the ratio of styrene to maleic anhydride in the styrene-maleic anhydride copolymer (2) is about 1:1 to about 3:1, the said anhydride equivalent ratio of anhydride equivalents of said maleic anhydride (1) to the sum of the anhydride equivalents in the anhydride component (b) is from about 0.4:1 to about 0.9:1, and the polyepoxide is a diglycidyl ether of bisphenol A at an A/E ratio of about 0.3:1 to about 1.5:1.

13. A method in accordance with claim 9 in which the ratio of styrene (a) to maleic anhydride (1) is about 1:1 to about 3:1, the saturated anhydride component is styrene-maleic anhydride copolymer, the ratio of styrene to maleic anhydride in the styrene-maleic anhydride copolymer (2) is about 1:1 to about 3:1, the said anhydride equivalent ratio of anhydride equivalents of said maleic anhydride (1) to the sum of the anhydride equivalents in the anhydride component (b) is from about 0.5:1 to about 0.8:1, and the epoxy component is a polyepoxide consisting of a diglycidyl ether of bisphenol A at an A/E ratio of about 0.5:1 to about 1.3:1.

14. A method in accordance with claim 13 in which the copolymerization is carried out in a maximum exotherm of about 125° C.

15. A method in accordance with claim 13 in which the homogeneous mixture comprises about 25 weight percent styrene, about 25 weight percent of a 2:1 styrene-maleic anhydride copolymer, about 12 percent maleic anhydride, about 38 percent of a diglycidyl ether of bisphenol A and the anhydride accelerator comprises from about 0.1 to about 5 percent of a tertiary nitrogen compound.

16. The handleable, thermosettable, moldable composition produced by the method of claim 15.

* * * * *

UNITED STATES PATENT AND TRADEMARK OFFICE
CERTIFICATE OF CORRECTION

PATENT NO. : 4,017,453
DATED : April 12, 1977
INVENTOR(S) : William J. Heilman, Frank C. Peterson, Mical C. Renz and Leslie P. Theard It is certified that error appears in the above-identified patent and that said Letters Patent are hereby corrected as shown below:

Col. 2, line 61, "rection" should read --reaction--.
Col. 6, line 56, "(2.1.2)" should read --(2.2.1)--.
Col. 7, line 63, "reaction" should read --reason--.
Col. 8, lines 60 and 61, "conveniently" should read --conventionally--.
Col. 10, line 29, "the" should read --then--.
Col. 11, line 67, "to an" should read --at an--.
Col. 12, line 51, "(2.44 kg./cm$^2$)" should read --(2.44 kg./m$^2$)--.
Col. 13, line 44, "(4.27 kg./cm$^2$)" should read --(4.27 kg./m$^2$)--.
Col. 14, line 13, "continued" should read --contained--.
Col. 14, line 50, "a" should read --A--.
Col. 14, line 66, "has" should read --had--.
Col. 15, line 9, "826 g." should read --826 and 382 g.--.
Col. 16, line 21, "65°" should read --65° C.--.
Col. 17, line 53, "is" should read --in--.
Col. 18, line 10, "has been" should read --had been--.
Col. 20, line 10, "and1" should read --and--.
Col. 22, line 18, "3.6" should read --3.6 kg.--.
Col. 22, line 28, "and 10" should read --for 10--.
Col. 24, line 25, strike "monoanhydride (1)" and insert --monomer (a)--.
Col. 24, line 26, strike "monomer (a)" and insert --monoanhydride (1)--.
Col. 25, claim 5, line 11, "wit" should read --with--.
Col. 26, claim 14, line 57, "out in" should read --out at--.

Signed and Sealed this thirtieth Day of August 1977

[SEAL]

Attest:

RUTH C. MASON
Attesting Officer

C. MARSHALL DANN
Commissioner of Patents and Trademarks